US005582899A

United States Patent [19]

Chiuminatta et al.

[11] Patent Number: 5,582,899

[45] Date of Patent: Dec. 10, 1996

[54] CONCRETE SURFACE WITH EARLY CUT GROOVES

[76] Inventors: Edward Chiuminatta; Alan R. Chiuminatta, both of 6677 Columbus, Riverside, Calif. 92504

[21] Appl. No.: 86,944

[22] Filed: Jul. 2, 1993

Related U.S. Application Data

[63] Continuation of Ser. No. 680,816, Apr. 4, 1991, abandoned, which is a continuation of Ser. No. 539,783, Jun. 18, 1990, abandoned, which is a division of Ser. No. 386,814, Jul. 27, 1989, Pat. No. 4,938,201, which is a division of Ser. No. 185,055, Apr. 22, 1988, Pat. No. 4,889,675, which is a continuation of Ser. No. 843,779, Mar. 25, 1986, Pat. No. 4,769,201.

[51] Int. Cl.[6] .......................................................... B32B 3/00

[52] U.S. Cl. ............................ 428/167; 264/31; 264/154; 404/47; 404/70; 405/256; 405/257

[58] Field of Search .................................... 264/154, 162, 264/163, 333, 293, 31; 425/136, 142, 298, 385; 83/875, 876, 877, 878; 30/370; 404/89, 93, 47, 70; 405/256, 257; 428/167

[56] References Cited

U.S. PATENT DOCUMENTS

| | | |
|---|---|---|
| 461,325 | 10/1891 | Deniston . |
| 1,356,339 | 10/1920 | Clarke . |
| 1,404,342 | 1/1922 | Clarke . |
| 1,726,665 | 9/1929 | Heltzel . |
| 1,731,872 | 10/1929 | Schons . |
| 1,736,538 | 11/1929 | Kurtz . |

(List continued on next page.)

OTHER PUBLICATIONS

"Plastic Grooving Stretches Airport Funds", pp. 80–81, Highway & Heavy Construction, Sep. 1977.

"Transitube", advertisement and directions, Middlestadt Corp., Baltimore, MD, circa 1967.

"Green–Con", advertisement, Clipper Mfg. Co. Inc., Kansas City, MO.

"Guide for Concrete Floor and Slab Construction", circa 1980, pp. 1–46.

"Flat Sawing", Concrete Coring Co., Hawthorne, CA 1970.

"Contractors' Choice: 25 Interesting Products", Electrical Contractors Magazine, Dec. 1980 pp. 63–64.

"Concrete Tools and Accessories", Catalog, p. 11, UNK., circa 1980.

"Miracle Diamond Blade", advertisement, House of PFAFF, Elberton, GA.

"The Ultra Saw", Potomac Tool Mfg. Co., Alexandria, VA.

"Electric Quickie", advertisement, Target Products, Inc., Kansas City, MO.

"Potomac Tool and Drilling", advertisement, Potomac Tool and Drilling, Alexandria, VA.

*New Highway Joint Cutting Saves Bumps and Bucks,* The Borden Company Chemical Division, Advertisement from Business Week Nov. 5, 1955.

Cardinal Industries Price List Dated Apr. 24, 1979.

*The Effect of Aggregate on Concrete Sawing Costs,* Industrial Diamond Association of America, Inc.

*What Choice Joints, Here are 10 Different Methods,* Industrial Diamond Association of America, Inc.

*Questions and Answers About Concrete And Asphalt Sawing,* Industrial Diamond Association of America, Inc.

*Sawed Joint in Portland Cement Concrete,* Industrial Diamond Association of America, Inc.

*Primary Examiner*—Karen Aftergut
*Attorney, Agent, or Firm*—Knobbe, Martens, Olson & Bear

[57] ABSTRACT

In order to cut soft concrete before it has completely hardened, or about 12 to 18 hours after finishing, a rotating cutting blade and its drive motor are mounted on a wheeled support platform. The blade extends through a slot in the platform, and also through a skid plate depending from the platform, in order to cut the concrete below the skid plate. The slot and the skid plate are sized to support the concrete as it is being cut and to inhibit cracking and chipping of the concrete during cutting. The slot preferably has as little space as possible between the sides of the slot and the adjacent sides of the cutting blade. An extendable handle allows the device to be used beyond the physical reach of the operator.

43 Claims, 3 Drawing Sheets

U.S. PATENT DOCUMENTS

| | | | |
|---|---|---|---|
| 1,740,074 | 12/1929 | Crowe . | |
| 1,778,451 | 10/1930 | Edge . | |
| 1,813,231 | 7/1931 | Crowe . | |
| 1,916,887 | 7/1933 | McClain . | |
| 1,921,185 | 8/1933 | Heltzel . | |
| 1,966,489 | 7/1934 | Edge . | |
| 1,997,216 | 4/1935 | Heltzel . | |
| 2,217,923 | 10/1940 | Silverman . | |
| 2,487,277 | 11/1949 | Siftar . | |
| 2,623,557 | 12/1952 | Kendall . | |
| 2,673,725 | 3/1954 | Coates . | |
| 2,688,347 | 9/1954 | Schmidt . | |
| 2,700,256 | 1/1955 | Lewis . | |
| 2,701,134 | 2/1955 | Klicpera . | |
| 2,722,244 | 11/1955 | Schultz . | |
| 2,736,311 | 2/1956 | Coates . | |
| 2,854,043 | 9/1958 | Raymond . | |
| 2,937,327 | 5/1960 | Vossberg . | |
| 2,949,068 | 8/1960 | Gresham . | |
| 2,996,089 | 8/1961 | McCarty . | |
| 3,270,785 | 9/1966 | Molitor . | |
| 3,273,939 | 9/1966 | Hatcher . | |
| 3,283,674 | 11/1966 | Hahn . | |
| 3,301,601 | 1/1967 | Zuzelo . | |
| 3,464,737 | 9/1969 | Haase et al. . | |
| 3,585,980 | 6/1971 | Mellor . | |
| 3,598,446 | 8/1971 | Hatcher . | |
| 3,623,518 | 11/1971 | Nicotra . | |
| 3,648,575 | 3/1972 | Rasmussen . | |
| 3,663,060 | 5/1972 | Shatwell et al. . | |
| 3,702,093 | 11/1972 | Van de Loock, et al. . | |
| 3,722,496 | 3/1973 | Schuman . | |
| 3,775,018 | 11/1973 | Barton . | |
| 3,775,529 | 11/1973 | Steenson et al. . | |
| 3,779,607 | 12/1973 | Staab . | |
| 3,866,384 | 2/1975 | Peterson, Jr. et al. . | |
| 3,910,711 | 10/1975 | Moorhead . | |
| 3,985,848 | 10/1976 | Frische et al. . | |
| 3,994,639 | 11/1976 | Hewitt . | |
| 4,020,550 | 5/1977 | Okada . | |
| 4,022,182 | 5/1977 | Lenkevich . | |
| 4,181,449 | 1/1980 | Lenker . | |
| 4,188,934 | 2/1980 | Reinhardt et al. . | |
| 4,236,356 | 12/1980 | Ward . | |
| 4,247,148 | 1/1981 | Eriksson . | |
| 4,253,816 | 3/1981 | Tobias et al. . | |
| 4,356,748 | 11/1982 | Tilton . | |
| 4,416,842 | 11/1983 | Nash et al. . | |
| 4,456,303 | 6/1984 | Due . | |
| 4,483,071 | 11/1984 | Kolste . | |
| 4,493,584 | 1/1985 | Guntert . | |
| 4,545,121 | 10/1985 | Armbruster et al. . | |
| 4,769,201 | 9/1988 | Chiuminatta et al. | 264/154 |
| 4,889,675 | 12/1989 | Chiuminatta et al. | 264/154 |

Fig. 1
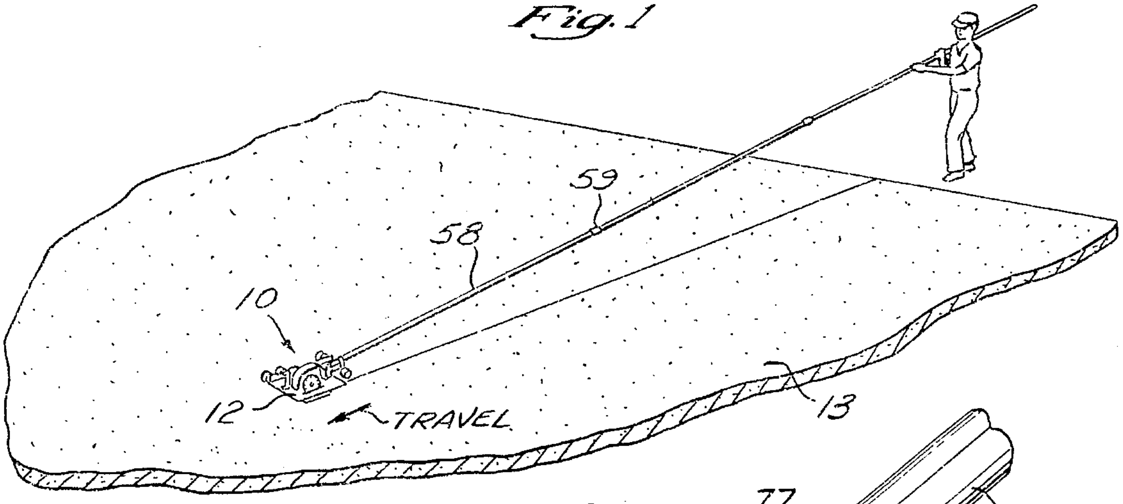
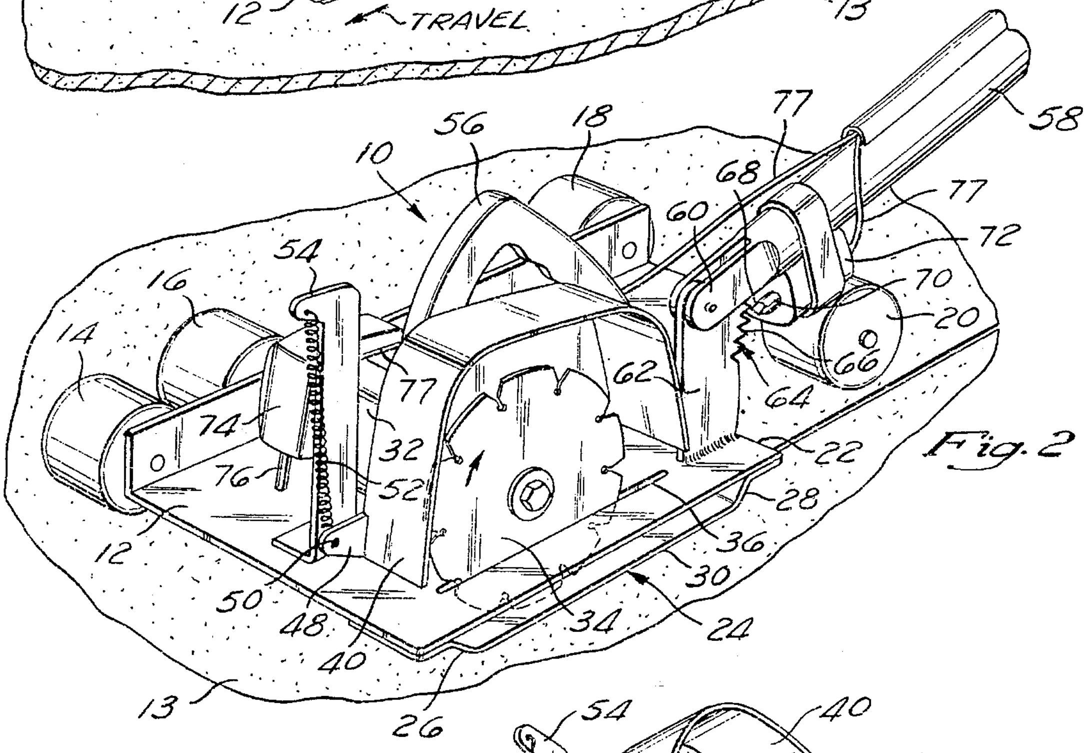
Fig. 2
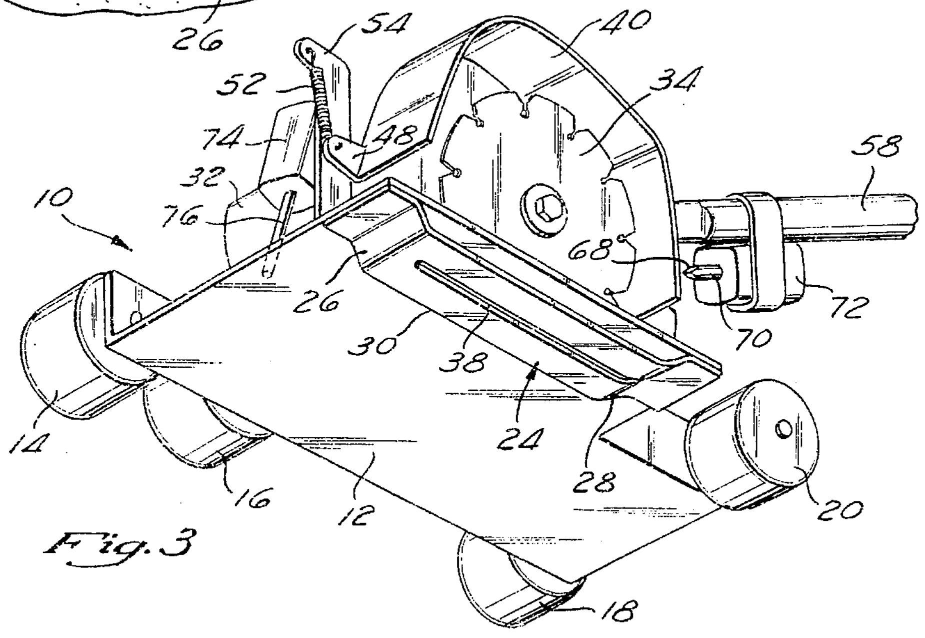
Fig. 3

Fig. 4
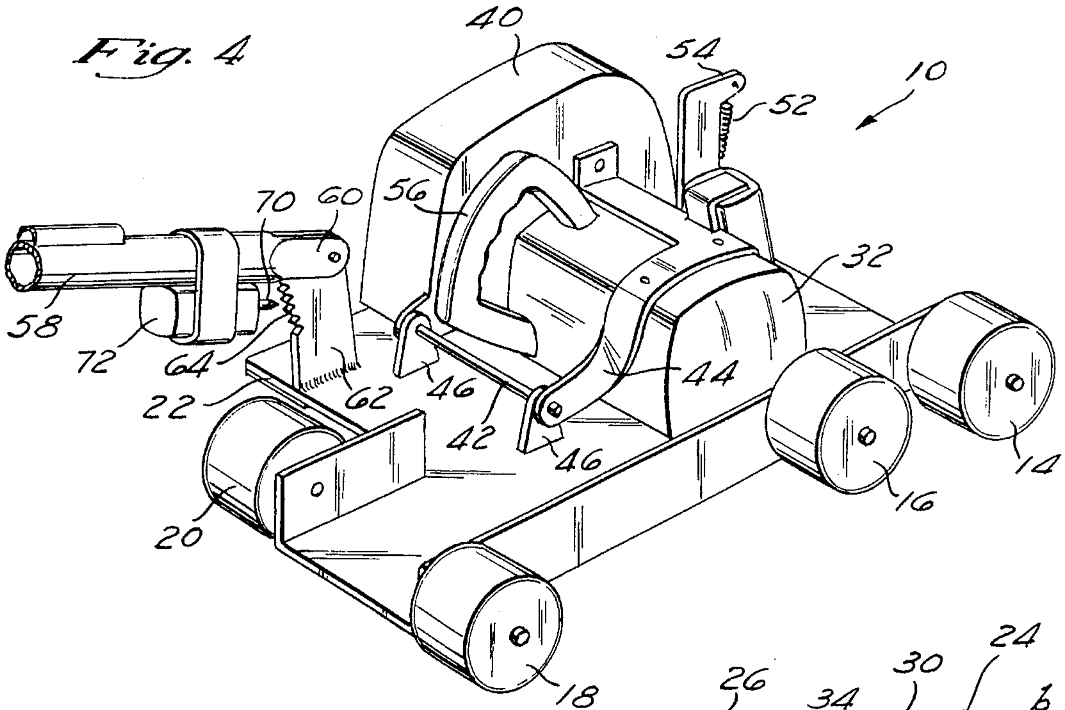
Fig. 5
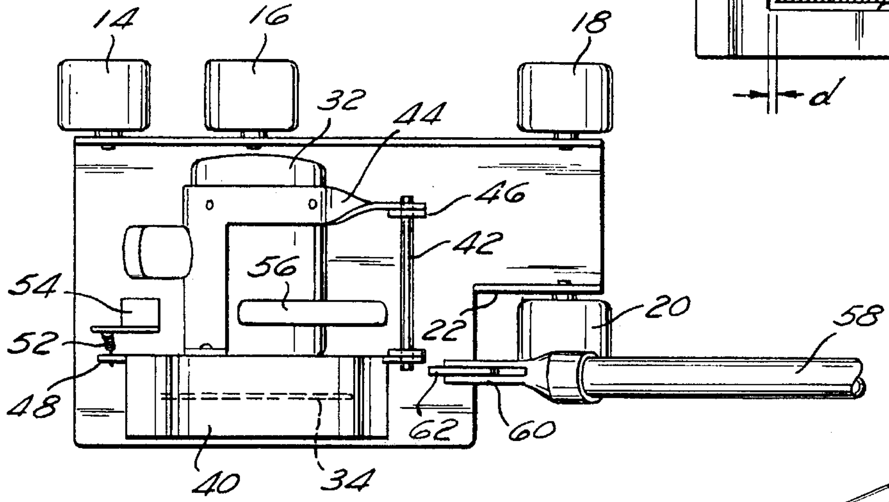
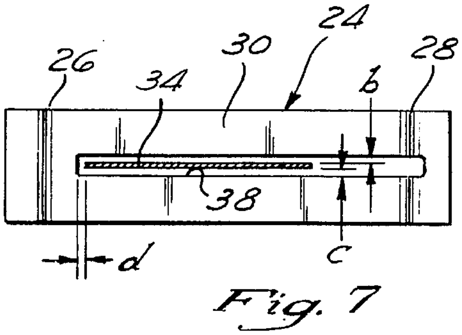
Fig. 7
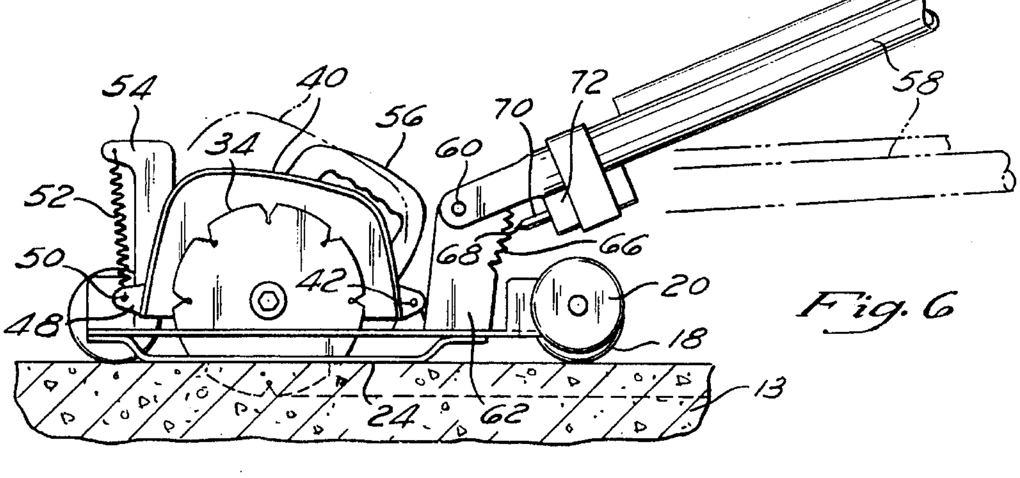
Fig. 6

CONCRETE SURFACE WITH EARLY CUT GROOVES

This application is a continuation of application Ser. No. 07/680,816 as originally filed on Apr. 4, 1991, abandoned, which is a continuation of application Ser. No. 539,783, now abandoned, filed Jun. 18, 1990, which is a division of application Ser. No. 386,814 filed Jul. 27, 1989, which issued as U.S. Pat. No. 4,938,201 on Jul. 3, 1990, which is a division of application Ser. No. 185,055 filed Apr. 22, 1988, which issued as U.S. Pat. No. 4,889,675 on Dec. 26, 1989, which is a continuation of application Ser. No. 843, 779 filed Mar. 25, 1986, which issued its U.S. Pat. No. 4,769,201 on Sep. 6, 1988.

BACKGROUND OF THE INVENTION

This invention relates to concrete, which is a combination of a hydraulic cementing substance, aggregate, water, and, often other substances to impart specific properties to the concrete.

When concrete is poured it is typically in a watery or flowing state which allows the concrete to be spread evenly over floors. After a period of time, varying with the mixture of the concrete, the temperature, and the moisture availability, the concrete attains a workable plasticity which permits the surface of the concrete to be formed and to retain a finish. Typical finishing means include troweling, rubbing, or brushing. Applying the desired surface texture is called "finishing" the concrete, and may involve repeated steps to sequentially refine the surface finish.

After the concrete is finished, it is allowed to stand for a period of time during which the concrete cures to obtain its well-known, rock-like hardness. The curing or setting time depends on the moisture available, the temperature, and the specific additives added to the concrete to affect the curing time. AS the concrete cures it undergoes thermal stresses causing the concrete to expand and contract in various manners depending on the shape and thickness of the concrete, and the type of concrete. These thermal stresses can cause cracking. The fully cured and hardened concrete also expands and contracts due to temperature changes with the result that cracks form in the concrete.

It is common practice to provide slots or grooves at predetermined intervals in the concrete. If the grooves extend all the way through the concrete, they can act as an expansion or contraction joint to help prevent cracking of the concrete. If the grooves are only on the surface of the concrete, then the grooves cause the cracks to form along the grooves so that they occur at regular intervals and are not visible. The grooves, but not the cracks, are visible.

One advantage to placing the grooves in the soft, concrete is that a weakened plane is provided by the groove and that weakened plane is now installed before the concrete starts to cure and shrink. The concrete slab will typically seek out the weakened plane to crack in, if the plane is prematurely there.

Presently, these grooves are provided by forming or grooving a slot in the concrete with a grooving trowel, while the concrete is still wet, just after pouring. This grooving is done while the concrete is very wet, and before the concrete is sufficiently hard to support a persons weight. Thus this grooving typically requires a support structure which would enable the person doing the grooving to reach the interiors of concrete slabs without placing the person's weight on the concrete. When the concrete slabs become sufficiently large, this method of providing grooves proves impractical and expensive.

This type of grooving must be done when the concrete is sufficiently wet, otherwise the grooving trowel cannot shove entrained rocks out of the way without it disrupting the surface finish on the concrete. Essentially, the concrete must be grooved Just after it is has just been poured, at which time the concrete is so wet that the concrete sometimes tends to sag back together and close the groove, thus requiring repeated grooving to maintain a desired groove depth or shape.

For very large slabs of concrete, manually grooving the freshly poured concrete is impractical or very inconvenient and expensive. For such large slabs, the concrete is typically allowed to harden or set. Grooves are then cut in the surface of the concrete by use of a high-powered, rotating, abrasive saw blade, often lubricated with water. The blade is typically made of diamond abrasive material and is provided with a liquid coolant and lubricant to facilitate cutting the hardened concrete.

Since these concrete cutting machines tend to be heavy, the concrete must be fairly hard in order to support the weight of the machine and operator. Further, if the concrete is not sufficiently hard when cut, these machines produce an unacceptably rough cut with a chipped or cracked surface along the groove. However, the harder the concrete, the more difficult it is to cut.

It is possible to use a hand held rotary saw as is often used in cutting lumber, but using a blade designed to cut concrete. Such saws are lighter weight, but still require hard concrete to support the operator and to provide cut grooves with acceptable smooth edges.

On an extremely hot and dry day, the concrete may be sufficiently hard to support a person's weight and not leave a permanent indentation, about twelve hours after the concrete has been poured. Typically, the concrete is not walked upon or cut until at least the next day, or about eighteen hours after the concrete has been finished.

If the concrete is cut by a conventional water lubricated diamond-abrasive saw, the earliest it can be cut is the next day after finishing (about 18 hours), and even then a unacceptable cut is typically produced as the edges of the concrete by the groove tend to chip, spall and crack.

One major problem with cutting after the concrete cures and hardens is that between the time of the initial finish and the time it becomes practical for a conventional concrete saw to be used, the concrete slab will have started its normal characteristic to shrink as it dries, thus causing contraction stress and invariably cracking before the sawing of contraction joints can be performed. This characteristic shrinking usually takes place somewhere between the time the initial finish is completed and before it becomes practice to put a conventional saw-cutting machine on the slab. The result is cracking of the slab before saw cutting can be initiated.

Further, cutting the hard concrete is a slow process, which is slowed still further to periodically replace the cutting blades as they abrade away. Finally, these types of machines tend to be not only bulky, but also expensive and time consuming to operate and maintain. The noise of the saw abrading the hardened concrete is also very loud and unpleasant.

There thus exists a need to provide an easier and faster apparatus and method for putting grooves in concrete before the concrete cracks.

SUMMARY OF THE INVENTION

An apparatus is provided for cutting a groove in soft concrete. The apparatus can cut the concrete anytime after the concrete is finished and before the concrete attains its rock like hardness, and preferably before the concrete has shrunk sufficiently to cause cracking along planes other than those planes defined by the cut grooves.

The soft concrete saw has a base plate on which are mounted two wheels and a skid plate, each of which contacts the concrete to provide a three point support on the concrete. A motor is pivotally mounted on the base plate. The motor drives a circular saw blade with an up cut rotation. The saw blade extends through a slot in the platform, and through a corresponding slot in the skid plate, in order to project into and cut the concrete below the skid plate.

The dimensions of the slot in the skid plate are selected to support the concrete immediately adjacent the saw blade so as to prevent cracking of the concrete as it is cut. The dimensions of the slot in the platform are also selected to inhibit excessive build-up of concrete on the platform as the saw blade cuts a groove in the concrete.

The motor is movably mounted on the platform so that the motor and saw blade can rise up when the saw blade hits a rock entrained in the concrete. A spring connected between a support on the baseplate and the motor, resiliently urges the saw blade into the concrete and allows adjustment of the force exerted by the saw blade on the concrete which is being cut. This spring controls the ease with which the saw blade moves as the saw blade hits a rock or other obstruction in the concrete and helps prevent concussion cracks as the blade hits such rocks or obstructions in the concrete.

A handle is pivotally attached to the base plate to shove the base plate and saw across a large slab of concrete without hindering the pivoting motion of the saw blade. Depending upon the size of the concrete slabs which must be cut, a varying number of handle extensions can be added to move the saw across the concrete.

If the saw is to be retracted after being extended across a slab, then a solenoid can raise the saw blade out of the concrete. A second solenoid locks the handle into a rigid orientation with respect to the base plate. Shoving downward on the handle then rotates the base plate onto two wheels while simultaneously raising the skid plate off of the concrete so as to allow the saw to be pulled back across the concrete on two wheels with minimum impact on the finish of the concrete from the sliding of the skid plate.

To help start the saw on the edges of the concrete, an extra wheel can be added to the baseplate, opposite the saw blade, in order to provide a stable support as the saw blade begins cutting into the edge of the concrete. This extra wheel can be offset slightly above the other wheels on the base plate so that once the normal wheels are on the concrete, the extra wheel is raised above the concrete and no longer contacts the concrete. Thus, the skid plate and two of the wheels provide a three point support and minimize rocking of the base plate.

There is thus provided a light weight saw for cutting soft concrete without the need for extensive alignment or support apparatus. Further, since the saw is cutting soft concrete, the blade need not be replaced as often, nor need the saw be as complex and expensive as previous saws.

DESCRIPTION OF THE DRAWINGS

The present invention will be better understood from the description of the preferred embodiment which is given below, taken in conjunction with the drawings (like reference characters or numbers refer to like parts throughout the description), and in which:

FIG. 1 is a perspective view of the invention being operated in the middle of a slab of concrete;

FIG. 2 is an elevated perspective view of the front of the saw of this invention showing the motor and blade in a lowered position.

FIG. 3 is a lower perspective view of the saw of this invention, showing the motor and blade in a raised position;

FIG. 4 is an elevated perspective view of the back of the saw of this invention;

FIG. 5 is a top elevational view of the saw of this invention;

FIG. 6 is a side elevation of the saw of this invention in operation;

FIG. 7 is an elevational view of the saw blade and slot in the skid plate;

FIG. 12 shows how the quality of the cut groove is affected by the spacing between the cutting blade and the sides of the aperture in the base plate.

DESCRIPTION OF THE PREFERRED EMBODIMENT

Figure 8:
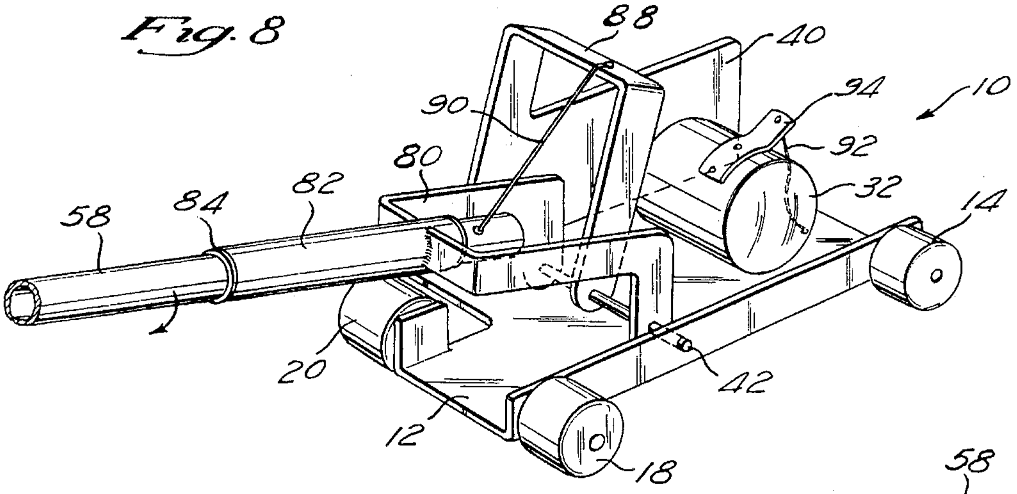
FIG. 8 is a perspective view of an alternate embodiment of this invention.

As is shown in FIG. 2, by way of illustration, and not by limitation, a soft concrete saw 10 comprises a base plate 12 having a generally rectangular shape. The base plate 12 has a lower surface generally facing a slab of concrete 13, with an upper surface of the base plate facing away from the concrete 13.

Along one of the longer sides of the rectangular plate 12 there are attached two front wheels 14 and 16, and a rear wheel 18. On the other long side of the rectangular base plate 12, generally opposite the rear wheel 18, it is located rear wheel 20. The rear wheel 20 sets in a recess 22 (FIG. 4) in the base plate 12 such that the edge of the rear wheel 20 does not project beyond the edge of the generally rectangular base plate 12, as described in more detail hereinafter.

A support surface or plate is in movable contact with the surface of the concrete 13 in order to support the surface of the concrete immediately adjacent the groove being cut in the concrete 13. In the illustrated embodiment, this surface takes the form of a skid plate 24 which depends from the base plate 12 in the direction of the concrete 13. The skid plate 24 is on the same side of the base plate 12 as is the recess 22 and the rear wheel 20, and is adjacent the longer edge of the base plate 12. The skid plate is opposite the front wheels 14 and 16.

In normal use, the saw 10 is supported on the concrete 13 at three points, the skid plate 24, the front wheel 14, and the rear wheel 18. It is believed that the three points of contact provide a more stable support and cause less wobble of saw 10 than would other support methods. The wheels 16 and 20 are spaced approximately one-eighth to one-fourth of an inch from the plane defined by the skid plate 24 and wheels 14 and 18, so that the wheels 16 and 20 do not normally contact the concrete 13 as the soft concrete saw 10 is operated. The purpose of wheels 16 and 20 will be described later.

The wheels 14, 16, 18 and 20 can be the same wheels as used on roller skates or skateboards. The wheels are approximately 2.5 inches in diameter, and 2.5 inches wide. The wheels are mounted to the base plate 12 so as to rotate freely as the base plate 12 and saw 10 move along the concrete 13.

Referring to FIGS. 2 and 3, the skid plate 24 is a generally rectangular strip of metal having rounded ends 26 and 28 between which is a flat piece 30. The flat piece 30 is generally parallel to the base plate 12. The flat piece 30 contacts the concrete 13 in order to help support the weight of the saw 10. The rounded ends 26 and 28 prevent gouging the surface of the soft concrete 13 as the saw 20 cuts the concrete 13.

The area of the skid plate 24 in contact with the concrete 13, and the area of the wheels 14 and 18 which also help support the weight of the saw 10, are all sized to provide a large enough area to distribute the weight of the saw 10 without detrimentally marking or substantially damaging the surface finish on the soft concrete 13 which is being cut.

Referring to FIGS. 2 and 4, on the upper surface of plate 12 is mounted a motor 32. The motor 32 drives a rotating cutting means such as circular saw blade 34 (FIG. 4) which in turn cuts the concrete 13 (FIG. 2) to form a groove.

Referring to FIG. 2, saw blade 34 is typically circular and made of carborundum, or diamond coated steel. The blade 34 has two generally flat sides, a leading, or cutting edge, and a trailing edge. The saw blade 34 typically has little or no kerr, or tooth offset. Slots in the saw blade 34 carry the cut concrete out of the concrete 13 to leave a groove or slot in the concrete. In the illustrated embodiment, a 4.25 inch diameter saw blade is used. Such blades are commercially available.

The saw blade 34 rotates about an axis substantially parallel to the base plate 12, and substantially perpendicular to the direction of travel of the saw 10. The saw blade 34 thus rotates in a plane which is substantially parallel to the longer edges of the rectangular base plate 12, and substantially parallel to the direction of travel of the saw 10.

Referring to FIGS. 2 and 3, the saw blade 34 extends through an aperture such as slot 36 (FIG. 2) in the base plate 12, and also through an aperture such as slot 38 (FIG. 3) in the skid plate 24, in order to cut the concrete 13 (FIG. 2). Thus the slot 36 is a generally rectangular slot located substantially parallel to and along the length of the longer sides of the base plate 12.

Spaced below, and in substantial alignment with slot 36, is slot 38. The slot 38 is also generally rectangular in shape, and is placed in the flat piece 30 of skid plate 24. The width and length of slots 36 and 38 are sufficiently large so that the saw blade 34 does not bind and seize on the edges of those slots.

Referring to FIG. 2, the saw blade 34 rotates with an up-cut motion such that the rotation of the cutting edge of the saw blade 34 is out of the concrete 13 which is being cut, rather than being into the concrete 13. Alternately phrased, the rotation of the circular blade 34 is such as to impede the forward motion of the saw 10, rather helping pull the saw 10 in the direction of travel.

This up-cut saw rotation is used to remove the soft concrete from the groove cut by the saw blade 34. If the saw blade 34 had a down cut rotation, then the soft concrete cleared by the blade 34 could fill in the groove immediately behind the blade 34, effectively filling in the groove with soft concrete. The up-cut rotation removes the concrete 13 from the cut groove and helps prevent the return of that removed concrete from filling in and hardening in the slot.

This up-cut rotation of the blade 34 is contrary to conventional wisdom and usage which essentially says that the blade 34 should cut into the surface on which the quality of the surface finish adjacent the cut groove is important. Since the surface finish is important only on the visible surface of the concrete 13, conventional practice would require a down-cut rotation.

The reason for conventional practice is believed to be that the down-cut rotation relies on the mass of the concrete, into which the blade is cutting, to support the concrete adjacent the blade and to provide an acceptable quality of cut. Concrete has much better compressive capability than tensile capability. The down-cut rotation keeps the concrete adjacent the groove in compression, which minimizes chipping and cracking. The up-cut rotation places the concrete adjacent the groove in tension, which with a conventional concrete cutting device, would result in unacceptable chipping and cracking of the concrete adjacent the surface of the cut groove.

A safety shield 40 is connected to the motor 32 so as to surround and shield the portion of the cutting blade 34 which does not project through the slot 36 in base plate 12. The motor 32, shield 40, and blade 34 thus form an integral unit in the illustrated embodiment. In fact, it is believed possible to use a commercially available wood saw, sometimes called a circular hand saw, as the basic motor 32 and shield 40 of this invention. References to these parts as an integral unit does not mean, however, that they could not be separate components performing the same function.

For reasons described later, it is desirable to have the blade 34 movably mounted so that the blade 34 can yieldingly move in response to contact with obstacles in the concrete 13. In the illustrated embodiment, as shown in FIGS. 4 and 5, the motor 32, and thus the blade 34, is pivotally mounted to base plate 12 so as to rotate about an axis which is substantially parallel to the rotational axis of blade 34 (FIG. 5). There is thus a pivot shaft 42 which, has one end connected to motor 32 via a bracket 44, with the other end of the shaft 42 being connected to the shield 40. The pivot shaft 42 is rotatably connected to the base plate 12 by trunions 46. The longitudinal axis of pivot shaft 42 is substantially parallel to the rotational axis of motor 32 and is substantially perpendicular to the direction in which the concrete 13 (FIG. 2) is to be cut, grooved, or slotted.

In the illustrated embodiment there is a means for resiliently urging the blade 34 against the concrete 13 with a predetermined force. This resilient means preferably takes the form of resilient spring means, as follows.

Referring to FIGS. 2 and 5, attached to the shield 40 at the end of the shield which is opposite the connection with pivot shaft 42, is a projection 48. Referring now to FIGS. 2 and 6, projection 48 is on the exterior of the shield 40, away from the blade 34, and contains a notch or engaging aperture such as aperture 50. A tension spring 52 has one end engaging or connected to the aperture 50, with the other end of spring 52 connected to a post 54. The post 54 is connected to base plate 12 adjacent the motor 32, and is substantially perpendicular to the surface of the base plate 12.

In the illustrated embodiment, the spring 52 supports a portion of the weight of the motor 32, blade 34, and shield 40 so as to adjust or regulate the amount of force with which the blade 34 is forced against the concrete 13. Several factors can be varied to control the amount of force which the blade 34 exerts on the concrete 13 during cutting. Such factors would include the distance between the pivot shaft 42 and the motor 32, the distance between the pivot shaft 42 and the spring 52, the type, size, and method of mounting of the spring 52, and the weight of the motor 32.

In the illustrated embodiment, a 7.5 amp, 11,000 r.p.m. motor 32 weighing about 6.2 pounds, is connected to a spring 52 having a diameter of ⅜ of an inch, and an uncompressed length of 1.75 inches. The spacing between the spring 52 and the pivot shaft 42 is approximately 7.5 inches. The distance between the center line of the motor 32 (and the rotational axis of blade 34) and the pivot shaft 42 is approximately 3.5 inches.

Referring to FIG. 6, the force exerted by spring 52, and the resulting force exerted by blade 34 on the concrete 13, affects the quality of the slot or groove which is cut in the concrete 13. The concrete 13 is an aggregate of rock, and cement, with the rock being of variable size depending upon the requirements for the strength of the concrete 13. When the blade 34 hits a rock or other obstruction buried in the concrete 13, problems can arise. The tension on the spring 52 can be adjusted to reduce these problems and to accommodate varying sizes of aggregate in the concrete 13.

If the motor 32 and blade 34 are rigidly mounted to the base plate 12, then the entire concrete saw 10 can conceivably come to a Jolting halt until the blade 34 can cut through the entrained rock. Alternatively, if the concrete 13 is soft enough, the rock may be slightly pushed out of the way which can cause surface damage, an unacceptable saw cut, or residual cracking before the rock can be cut through. Still further, the saw 10 could bounce up so as to disengage the blade 34 or the skid plate 34 from contact with the concrete 13. In each of these cases, the sudden halt or change in the motion of concrete saw 10 can mar the surface finish of the concrete 13. Perhaps more importantly, the sudden impact of the blade 34 with the rock can jar the rock sufficiently to cause residual cracking of the concrete around the rock.

Similar results can occur if the blade 34 is mounted so that a predetermined force can cause the blade to move separate from the base plate 12, but an excessive force is exerted by the blade 34 on the concrete 13. The concrete can crack, a rough cut is made, end the surface finish of the concrete can be impaired.

The goal of the spring 52 and the pivoting of the motor 32 and blade 34 is to allow adjustment of the force between the blade 34 and the concrete 13, and to allow movement of the blade 34, so that the contact between the blade 34 and an entrained obstacle, such as a rock, does not damage the surface of the concrete 13 or cause residual cracking of the concrete 13.

For the illustrated embodiment, the weight or force exerted by the motor 32, shield 40 and blade 34 is about 5.5 pounds, which is greater than desired. In the illustrated embodiment the spring 52 offloads a portion of the weight so that only about 2.5–3.0 pounds of force are exerted by the blade 34 on the concrete 13. Thus the blade 34 is resiliently urged into contact with the concrete with a force of about 3.0 pounds. If needed, the extension spring 52 could be readjusted or replaced with an appropriately sized spring in order to provide the desired predetermined force between the blade 34 and the concrete 13.

One result of adjusting the force between the blade 34 and the concrete 13 is that the depth of the groove cut by the blade 34 can vary depending on how fast the saw 10 is moved. Further, the depth of the groove may be less when the blade 34 hits rocks entrained in the concrete 13. For example, it is believed preferably for the depth of the grooves cut by saw 10 to be about 0.5 inches deep, with a minimum depth of 0.125 inches being marginally acceptable. As the force of the spring 52 offloads more and more of the force exerted by blade 34, the blade 34 will cut a shallower and shallower groove for a constant travel of saw 10. If a full depth cut groove is required, the saw 10 most move slower as the force between the blade 34 and the concrete 13 increases with the depth of the groove. If the saw 10 is moving fast enough, then when the blade 344 hits an entrained rock, the blade 34 bounces up, only partially cutting the rock, and cutting a shallower groove at that point.

Alternately phrased, the greater the tension applied to the spring 52, the less the weight or force applied to the saw blade 34, which in turn provides a faster forward cut but also a shallower cut. The less the tension applied to the spring 52, the greater the weight applied to the saw blade 34 which in turn deepens the overall groove depth and slows the forward travel. If too much weight is applied to the blade 34, the skid plate 24 will rise off of the surface of concrete 13 and the groove quality will become unacceptable.

The exact mechanism by which the offloaded and pivoted blade 34 optimally cuts through entrained rocks is uncertain. It is believed that a correct selection of the force exerted by the blade 34 on the concrete 13 will allow the blade 34 to rise up over an entrained rock so as to circumvent the rock. It is believed that rising up to the rock allows the blade 34 to cut down into the rock and does not cause a severe jolt to either the entrained rock or the concrete saw 10. This force selection must consider the individual concrete mix design, and especially the size of the aggregate (rock) in the concrete. Alternately phrased, it is believed that if the force with which the blade 34 is urged into the concrete 13 is too great, then the operator must shove the saw 10 in order to cut sideways through the rock. The result is residual cracking around the rock, either from the initial impact of the saw 10 with the entrained rock, or from the sideways force of the operator cutting sideways through the rock.

It is believed that if the force is correctly adjusted, the blade 34 can resiliently accommodate the impact with the entrained rock to minimize or prevent damage to the concrete finish. A trade off between the desired depth of the cut groove, and the permissible variations in that depth of the cut groove exists. The illustrated embodiment is one combination that has been judged preferably when working with aggregate up to one (1) inch in size.

This problem with obstructions, such as entrained rocks, is not encountered with conventional cutting machines since the concrete 13 is sufficiently hardened, and the progress of the saw sufficiently slow, so that the entrained rocks are cut without the residual cracking concrete. For the grooving trowels, the entrained rocks are no problem since the concrete is grooved just after pouring, while the rocks can be slowly urged out of the way of the grooving trowel without causing cracking.

While the amount of force between the blade 34 and the concrete 13 may vary somewhat depending upon the size of the blade 34 and the size of the rocks entrained in the concrete 13, it is believed that this force should be about 2.5–3.0 pounds for the illustrated embodiment. This force has a been found suitable for cutting a ½ inch deep groove in a 4 inch thick slab of concrete 13, with rock or aggregate up to 1 inch in size.

The quality of the groove cut in the concrete 13 is also affected by the size of the slot 38 (FIG. 3) with respect to the portion of the blade 34 extending through that slot. The force exerted on the concrete 13 by the skid plate 24 helps to support the surface of the concrete 13 immediately adjacent the groove which is being cut in the concrete 13. If the spacing between the sides of the blade 34 and the slot 38 is too great, then the edges of the cut groove will become rough and uneven. It is also possible that spalling, chipping, or surface cracking immediately adjacent the edges of the groove will occur. It is preferred to have the skid plate 24 support the concrete 134 immediately adjacent the groove being cut by the blade 34.

Referring to FIG. 7, it is preferred that the spacing b and c between the sides of the blade 34 and the sides of the slot 38 in the skid plate 24 be controlled. Testing indicates that a spacing as close as possible to zero, without binding, provides the best surface finish adjacent the cut groove. A spacing of less than 1/16 inch (0.0625 inch) produces a cut groove of acceptable quality with no readily perceived cracks or chips or jagged edges a spacing of 1/16 inch or slightly greater of b and c, provides a surface finish adjacent the groove that is judged to be of questionable acceptability, having chips and cracks that are not perceptible at a distance, but noticeable close up. A spacing of 3/32 of an inch provides a groove that is usually unacceptable in terms of chipping and cracking, and overall finish. A spacing of over 3/16 of an inch provides a groove deemed unacceptable in terms of cracking, spalling, or cosmetic appearance at the edge of the groove.

These results are derived from test data which indicates that the relationship between the slot spacing and the quality of cut is not linear. FIG. 12 below, illustrates the test data and shows the manner in which the spacing is believed to affect the quality of the surface finish of the concrete 13 adjacent the cut groove.

It is believed that the effect of the spacing b and c on each side of the saw blade 34 is independent of the quality of the cut or groove formed on the other side of the blade 34. Thus, it is possible to have the surface finish on one side of the groove acceptable, with the opposite side of the groove producing an unacceptable finish adjacent the cut groove because of too wide a spacing.

It is believed possible that the spacing may be critical only at the cutting edge of the blade 34 since that location is where the concrete 13 is being removed by the up-cutting motion of the blade 34, and the only place where the concrete 13 is being theoretically placed in tension by the blade 34 so as to cause cracking and chipping. In practice, however, the saw 10 may wiggle and wobble so that the blade 34 actually contacts the concrete 13 at points other than the cutting edge of the blade 34. Thus the slot 38 preferably has sides which correspond to the shape of the sides of the blade 34, and are spaced as closely as possible to the blade 34 without binding the rotation of the blade 34.

Referring to FIGS. 3 and 7, the spacing between the up-cutting or cutting edge of the rotating blade 34 and the adjacent end of the slot 38 is also controlled in the illustrated embodiment. If the front edge of the slot 38 extends into the rounded end 26 of the skid plate 24, then placing the cutting edge of the blade 34 adjacent this end of the slot 38 can cause a build up of the cut concrete which can squeeze out of the slot 38 and under the rounded end 26 so as to mar the surface finish of the concrete 13 or cause tilting of the saw 10.

It is preferred that the front or leading edge of the slot 38 which is adjacent the leading or cutting edge of the blade 34 not extend into the rounded end 26, but rather terminates in the flat piece 30. Further, it is preferred that the space d between the cutting edge of the blade 34 and the adjacent end of slot 38 be limited so as not to greatly exceed 1/4 of an inch. Ideally, there is zero spacing between the cutting edge of blade 34 and the end of the slot 38. However, as the blade 34 wears, a space will naturally develop, and a maximum space of about 1/4 inch is preferred.

The spacing between the back or trailing edge of the blade 34 and the end of the slot 38 also affects the quality of the cut groove. It is preferred that the slot 38 be extended into the rounded end 28, or alternatively that a tunnel or other open piece be provided. The presence of a flat piece of metal on the concrete 13, immediately following the groove cut by the blade 34, would act as a trowel serving to close over or otherwise compromise the quality of the groove which had previously been made. Extending the slot 38 all the way to the rounded end 28 prevents closure of the previously cut groove and also provides a sturdy attachment for the skid plate 24 which prevents undue vibration during operation of the concrete saw 10 (FIG. 3).

Referring to FIG. 2, this desire to prevent closing of the groove immediately after it has been cut, also affects the placement of the rear wheel 20. The outer edge of wheel 20 is preferably placed close to the rotational plane of the blade 34 and the groove cut by that blade, but not so close that the wheel 20 would cause closure of the groove cut in the concrete 13 by the blade 34.

The size of the slot 36 with respect to the blade 34 is also controlled in order to help prevent the freshly cut concrete from accumulating on the blade 34 and to prevent the freshly cut concrete from being returned to the groove which had just been cut. Thus, the width of the slot 36 is preferably as close to the width of the blade 34 as possible. Limitations on the length of the slot 38 must also consider accommodating motion of the blade 34 as it pivots around the shaft 42 (FIG. 4) when the blade 34 strikes rocks which are entrained in the concrete 13.

As the concrete 13 is removed from the groove by the slots in the blade 34, the concrete dislodges from the blade 34 and is deposited between the lower surface of the plate 12 facing the concrete 13, and the interior surface of the skid plate 24 which faces the plate 12. About 80% of the concrete removed by the blade 34 is deposited on the interior of skid plate 24. As more and more concrete dislodges and accumulates, the concrete is urged off of the skid plate 24 onto the adjoining surface of concrete 13. By the time the dislodged concrete exits the skid plate 24, it has hardened sufficiently so that it is nonadhesive and does not readily adhere or mold itself to the concrete 13. The heat from the cutting action of the blade 34 may contribute to this hardening.

It is not believed that the rotational speed of the blade 34 has any significant effect on the spacing between the blade 34 and the slot 38. The rotational speed of the blade 34 does not have some affect on the speed and ease with which the concrete saw 10 can cut across the surface of the concrete 13. Generally, a higher rotational speed of the blade 34 allows faster cutting and thus faster movement of the concrete saw 10.

Referring to FIG. 3, the width of the skid plate 24 is such that it not only supports a portion of the weight of the saw 10, but also allows hardening of the concrete after it has been removed from the groove cut by the blade 34. A minimum width of 0.5 inches has been found sufficient to allow the dislodged concrete to harden and/or air dry before it slides off of the skid plate 24 onto the adjoining concrete 13 (FIG. 2), yet sufficiently large to prevent the sides of the skid plate 24 from slicing like wire, or sinking, rather than providing a support surface with minimal marring on the surface of the concrete 13.

Referring to FIGS. 2 and 4, there is a handle 55 attached to the motor 32. The handle 55 can be grabbed by a person in order to carry the concrete saw 10.

Referring to FIG. 1, in order to enable operation of the saw 10 on large slabs of concrete 13, without the use of scaffolding to support the weight of the operator, extendable handles 58 can be attached to the base plate 12. The extendable handles 58 function like extendable broom handles to enable the saw 10 to be pushed out onto, and withdrawn from, a large slab of concrete 13. In short, the handle 54 provides a means of moving or propelling the saw 10 to cut grooves in the concrete 13. A more detailed description follows.

Referring to FIG. 2, the concrete saw 10 preferably has three points of support at all times the blade 34 is cutting the concrete 13. These three points typically comprise the skid plate 24, and two of the wheels 14, 16, 18, or 20, as described hereinafter. When the concrete saw 10 is first started on the edge of a concrete slab, the three points of contact comprise the skid plate 24 and the front wheels 14 and 16. The wheels 14 and 16 are approximately equal distance from, but on opposite sides of, the rotational axis of the blade 34. Thus, there is a stable three point support among the wheels 14 and 16 and the skid plate 24.

The front wheel 16 is located approximately ⅛ to ¼ of an inch further away from the concrete 13 than is the front wheel 14. Thus, when the saw 10 has cut sufficiently far out into the concrete 13 so that the rear wheel 18 rides onto the surface of the concrete 13, the wheel 16 is lifted out of contact with the concrete 13, and the three point support then comprises the skid plate 24, the front wheel 14, and the rear wheel 18. The offset wheel 16 thus serves as a guide and support for the concrete saw 10 as the saw 10 begins cutting into the edge of a concrete slab, but not thereafter.

The use of an offset wheel 16 during the initial portion of the cut made by the saw 10 does cause the blade 34 to cut at an angle with respect to the surface of the concrete 13, rather than cutting perpendicular to the concrete 13. The smaller the offset of the wheel 16 with respect to the other wheels, the less this angle will be.

During this initial cut on the edge of the concrete slab, the saw 10 could be operated by the handle 56 attached to the motor 32. After the saw 10 is extended to the edge of the operator's physical reach, the saw 10 can be operated by an extendable handle 58.

Referring to FIGS. 2 and 6, the handle 58 is pivotally connected to the base plate 12 at pivot block 60. The pivot block 60 allows the extendable handle 58 to pivot about an axis substantially parallel to the rotational axis of blade 34. As the concrete saw 10 moves onto the concrete 13 and further away from the operator, additional extensions can be attached to the extendable handle 58 at joints 59 (FIG. 1) in order to accommodate the necessary reach. The connection of extendable handles 58 at joints 59 can be by diverse means such as screw threads or bayonet mounts which are well known in the art and not described in detail herein.

The connection of the handle 58 to the base plate 12 provides a means for propelling the saw 10 without restricting the movement or pivot action of the blade 34 about the pivot axis 42. The use of the handle 56 attached directly to the motor 32 restricts pivoting of the blade 34, and can cause inadvertent damage to the finish of the concrete surface when the blade 34 hits a rock entrained in the concrete as previously described.

During operation of the saw 10, the greatest drag occurs at the blade 34 and skid plate 24. The pivot block 60 is preferably placed adjacent the blade 34 so as to move the concrete saw 10 without skewing the blade 34 and saw 10. If the blade 34 skews so that the blade 34 is not parallel to the line of travel of saw 10, then not only is the resulting groove in the concrete 13 wider than normal, but the skewing of blade 34 can cause immediate or residual cracking, spalling, or chipping in the surface of the concrete 13 immediately adjacent the groove. Thus, it is desirable to have the force pushing the concrete saw 10 applied so as to cause as little skewing of the blade 34 as possible.

Referring to FIG. 5, for the illustrated embodiment, applicant has found that the center line of the extendable handle 58 can be along a line substantially parallel to the cutting blade 34, and spaced approximately 1.5 inches therefrom, toward the motor 32.

Referring again to FIGS. 2 and 6, the concrete saw 10 has completed its cut, it may be desirable to retract the concrete saw 10, rather khan retrieve the saw 10 from the other side of the slab of concrete. As described below, mechanisms are provided to retract the blade 34 from the concrete 13, and to pivot the concrete saw 10 so as to disengage the skid plate 24 from sliding contact with the surface of the concrete 13.

The pivot block 60 is spaced apart from the base plate 12 by a boss 62 so that the pivot block 60 is above the surface of the base plate 12. On the boss 62 is mounted a selector bracket 64 which comprises a piece of metal roughly resembling a sector gear in shape. The selector bracket 64 has a narrow edge extending in the direction of the extendable handle 58. Into this edge are cut recesses or notches 66. These notches 66 are shaped and located so that they can mate with a tip 68 of a plunger 70 of a solenoid 72. The solenoid 72 is mounted on, and is substantially parallel to, the extendable handle 58.

In operation, the angle between the extendable handle 58 and the base plate 12 will vary depending upon the length of the handle 58 and the distance of the saw 10 from the operator. The angle is greater as the saw 10 comes nearer to the operator.

A remotely actuatable means is provided to allow removal of the saw 10 from a slab of concrete without dragging the skid plate 34 on the surface of the concrete 13. When it is desired to retract the saw 10 from the middle of a slab of concrete 13, the solenoid 72 is energized so that the plunger 70 extends to cause tip 68 to engage with an adjacent notch 66. Depending upon the angle of the extended handle 58, the tip 68 will engage differing notches 66. The engagement of the tip 68 with the notch 66 provides a linkage connection whereby the handle 58 may be shoved down towards the ground to exert a torque or moment onto the base plate 12. In essence, the notches 66 and plunger 70 serve to lock the handle 58 into a fixed position with respect to the saw 10. The result is that the saw 10 tilts onto the two rear wheels 18 and 20 as the handle 58 is pushed toward the ground, thus enabling the saw 10 to be rolled off of the concrete 13 slab without the skid plate 24 dragging on the concrete 13.

As seen from FIG. 6, the rear wheel 20 is also located approximately ⅛ to ¼ of an inch further away from the concrete 13 than is the rear wheel 18 or the front wheel 14, so that the wheel 20 does not normally contact the surface of the concrete 13. The offsetting of the wheel 20 causes a tile to the base plate 12 when the saw 10 is pivoted so that it can roll on the wheels 18 and 20. The base plate 12 must not overhang the offset wheel 20 so that the offset of the wheel 20 causes a corner of the base plate 12 to dig into the concrete 13 when the base plate 12 is tilted onto the rear wheels 18 and 20. To provide as wide a support as possible in order to help minimize this tilting, the rear wheel 20 is preferably placed as close to the plane of the saw blade 34 as possible, without causing the groove cut by the blade 34 to close.

Conceivably, the wheel 20 could be placed on the opposite side of the groove than the other wheels. It is also believed possible that the three points of support for normal operation could comprise the two rear wheels 18 and 20 and the skid plate 24, with the two offset wheels being the front wheels 14 and 16. In this case, the tilting of the base plate 12 would not occur during retrieval of the saw 10 since there would be no offset between the rear wheels 18 and 20, with both of those wheels being on substantially coplanar axis, if not the same axis.

Another remotely actuatable means is also provided to disengage the blade 34 from contact with the concrete 13. Referring to FIGS. 2 and 3, a second solenoid 74 can be used to pivot the blade 34 out of contact with the concrete 13 (FIG. 2) before the retraction of the saw 10, or at any time desired. This second solenoid 74 is preferably located adjacent the spring 52 so as to provide a force between the base plate 12 and the shield 40 which causes the blade 34 to pivot out of its normal position which is in contact with the concrete 13.

More specifically, there is shown the solenoid 74 connected to the motor 32. The solenoid 74 has a plunger 76 extending downward towards the base plate 12. When the solenoid 74 is energized, the plunger 76 extends to contact and push against the base plate 12 with the result that the shield 40, motor 32, and saw blade 34 pivot about the shaft 42 so as to rotate the blade 34 a predetermined distance, preferably out of contact with the concrete 13. Preferably, the solenoid 74 is connected adjacent the blade 34, perhaps attached to the shield 40, so as to place the force exerted by the solenoid 74 adjacent the greatest resistance to disengaging the blade 34 from the concrete 13.

Referring to FIG. 2, solenoids 72 and 74, and the motor 32 are connected to electrical wires 77 which run along extendable handle 58 to a control device (not shown) on the end of the handle 58 where they are controlled by the operator. Thus the solenoids 72 and 74 and the motor 32 can be remotely actuated by the operator of the saw 10. If the wires 76 are not sufficiently long, then connectors known in the art and not described in detail herein, allow the use of extensions to the wires 76 as more and more handles 58 are added.

A mounting bracket 80 is pivotally connected to the pivot shaft 42. The mounting bracket 80 is shown as connecting to the pivot shaft 42 at two locations on generally opposite sides of the base plate 12, in order to provide a stable connection to the saw 10. Connected to the mounting bracket 80 is a tubular cylinder 82 which is located so that it extends along a line parallel to the orientation of the saw blade 34. One end of the handle 58 extends through the cylindrical tube 82 such that the handle 58 can rotate within the tube 82. Various devices, such as snap rings 84, allow the handle 58 to rotate within the cylindrical tube 82, but restrain motion of the handle 58 along the longitudinal axis of the handle 58 and cylindrical tube 82.

Thus, the handle 58 can guide and propel the saw 10 through the connection with the bracket 80 and pivot shaft 42. The pivotal connection between the bracket 80 and the pivot shaft 42 allows the handle 58 to move up and down in a vertical orientation with respect to the concrete 13.

In this alternate embodiment, a U-shaped bracket 88 has one side connected top, and preferably integrally formed with safety shield 40. The open ends of the U-shaped bracket 88 are also pivotally connected to the pivot shaft 42 such that the bracket 88, safety shield 40, motor 32, and saw blade 34 are all connected so as to pivot about pivot shaft 42. Thus, the U-shaped bracket 88, and the mounting bracket 80, both pivot about the common shaft, pivot shaft 42.

Figure 10:
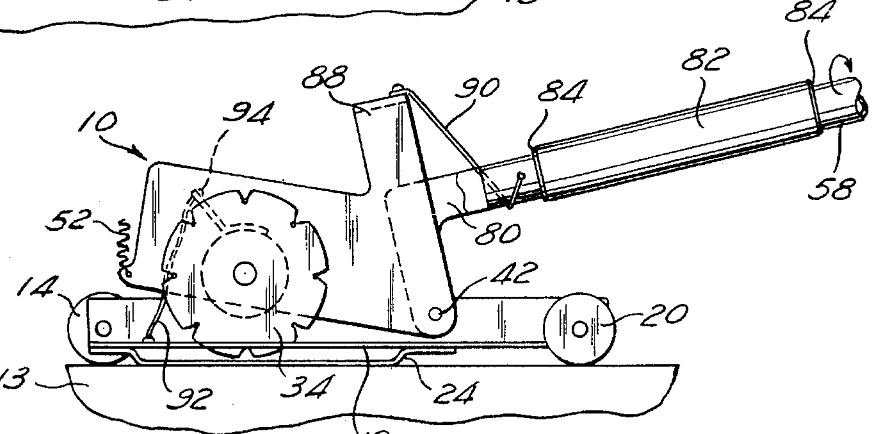
FIG. 10 is a sectional view taken along A—A of FIG. 8, showing an alternate embodiment of this invention.

A flexible member such as wire cord 90 has a first end connected to the U-shaped bracket 88, and a second end connected to that portion of the handle 58 extending through the cylindrical tube 82. As the handle 58 is rotated in the tube 82, the cord 90 wraps around the end of the handle 58 so that the length of the cord 90 is shortened. Shortening the length of cord 90 pulls on the bracket 88 and pivots the saw blade 34 about the pivot shaft 42 so that the saw blade 34 can be withdrawn from contact with the concrete 13, as illustrated in FIG. 10. Controlled shortening of the cord 90 can also be used to vary the depth of the groove cut in the concrete 13 by the saw blade 34.

The motor 32 is also connected to the base plate 12 by means of a second flexible member such as the second wire cord 92. Preferably, the second cord 92 has a first end connected to the front of the base plate 12, on the same end as the wheel 14 is located. The second end of the second cord 92 is preferably connected to a projecting bracket 94 which from, and is connected to, the motor 32 as shown in FIG. 8.

Figure 9:
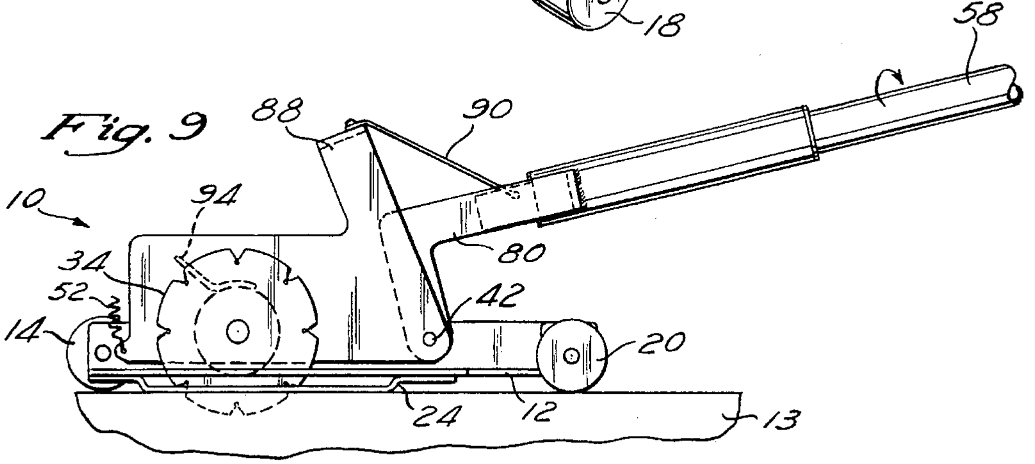
FIG. 9 is a sectional view taken along A—A of FIG. 8, showing an alternate embodiment of this invention.
Figure 11:
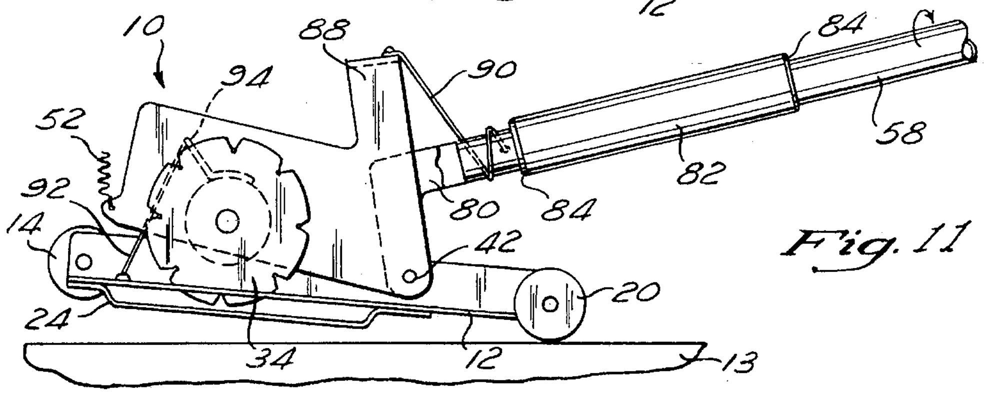
FIG. 11 is a sectional view taken along A—A of FIG. 8 showing an alternate embodiment of this invention.

The second cord 92 is normally slack when the saw blade 34 is its desired cutting depth in the concrete 13, as illustrated in FIG. 9. Preferably, the second cord 92 is also slack when the first cord 90 is shortened so as to cause the saw blade 34 to pivot out of contact with the concrete 13, as illustrated in FIG. 10. Further pivoting of the saw blade 34 and connected motor 32, causes the second cord 92 to become taut and exert a force on the front of the base plate 12. If the force exerted by the second cord 92 is sufficient, the saw 10 will pivot on the rear wheels 18 and 20 (FIG. 7), so that the skid plate 24 is moved out of contact with the surface of the concrete 13, as shown in FIG. 11.

Thus, the handle 58 can be used to not only propel and guide the saw 10, but also to disengage the saw blade 34 from the concrete 13, and further to disengage the skid plate 24 from contact with the surface of the concrete 13, so that the saw 10 can be withdrawn from the surface of the concrete 13 with minimum danger of damaging the surface of the concrete 13 by inadvertent scraping of the skid plate 24.

The saw 10 is preferably used to cut soft concrete, not hardened concrete. The saw 10 can be used Just after the concrete 13 has been finished. At the time of finishing, the concrete 13 has attained a workable plasticity that allows the concrete 13 to be worked and retain a surface finish, but the concrete 13 is not sufficiently hard to allow acceptable cutting by conventional saws or methods. The saw 10 can also cut concrete 13 which has set for several hours, and is believed to work with any concrete that is too soft, or not sufficiently hard, to be cut satisfactorily by conventional abrasive cutting machines.

As previously mentioned, such conventional cutting machines can produce cuts of unacceptable or dubious acceptability from as little as 12 hours after finishing if the day is extremely hot, say over 100 degrees fahrenheit. These conventional cutting machines typically are not used until the next day, (about 18 hours later) and even then typically produce unacceptable cuts. The saw 10 will typically be used before these 12 hour and 18 hour figures. The saw 10 allows "same day" cutting of grooves with acceptable surface finishes adjacent the cut grooves. It is believed that the saw 10 could be used at or beyond the 12 and 18 hour figures and produce a cut groove having a superior finish adjacent the surface of the groove when compared to the groove quality of conventional abrasive machines. However, the wear on the blade 34 would be greater than normal.

Ideally, the saw 10 would be used to cut grooves in the concrete 13 before the concrete 13 has incurred its characteristic shrink that occurs during setting, to an extent that cracks begin forming in the concrete 13.

More specifically, the finishing of concrete typically proceeds through several stages. The first stage is to pour the concrete, tamp it and "bull float" the surface to level the surface. At this stage, the concrete is wet, and cannot be walked upon without sinking into the concrete. If the concrete is grooved with an edger or grooving trowel, it is first done at this stage, but must be repeated later. The concrete is typically not left with this coarse of a finish, although such a rough finish may be adequate for road surfaces and such.

At this first stage the concrete has a hardness of which cannot be measured by the conventional Swiss Hammer tests used for concrete. The Swiss Hammer relies on the rebound of a shaft from the hardened surface of the concrete to measure hardness in pounds per square inch, or psi. At this bull float stage, the concrete is so soft that the plunger on the Swiss Hammer sinks into the concrete and does not rebound.

The saw 10 is believed to be able to cut the concrete at this bull float stage and form an acceptable groove, although the weight of the saw 10 will cause the skid plate 24 and wheels 14–20 to leave indentations in the surface of the wet concrete 13. If cut at this stage, the concrete 13 is preferably allowed to have its surface air dry so that the indentations from the weight of the saw 10 are minimal or non-existent.

The second stage of finishing is called the "fresno" stage. Here the concrete has hardened, but still cannot be walked on without sinking into the concrete. The finishing during this stage is done by long handled tools since the concrete will not support a persons' weight. The sequential working of the concrete surface with tools repeatedly brings moisture and cement to the surface and allows a smoother finish to be applied to the concrete 13. If grooves are formed in the concrete by use of a grooving trowel, the grooves must be regrooved at this stage, and after each successive finishing step.

The concrete during this fresno stage is still too soft to obtain an accurate hammer hardness. The surface of the concrete 13 is smoother than that of the first stage. The saw 10 will cut satisfactory grooves in the surface of the concrete 13 finished to this stage. Preferably, the surface of the concrete 13 will be allowed to air dry so as to minimize the marks formed in the surface of the concrete 13 by the weight of the saw 10.

Conventional concrete saws will not work satisfactorily at this fresno stage of finishing. The grooves will be jagged at the edges. The concrete will be washed away by the water lubricant of the abrasive cutting machines. Further, the weight of conventional cutting machines will leave unacceptable indentations in the surface of the concrete.

The third stage of finishing uses power trowels or finishing machines to repeatedly smooth the surface of the concrete 13. At this stage the concrete 13 is hard enough so a person will not sink in deeply, but the surface of the concrete 13 will form indentations from the person's weight. The operator of the finishing machines just walks so that the machine smooths out the indentations. This machine finishing is done several times, with the concrete surface being allowed to air dry between each finishing operation. With each finishing, moisture and cement is redrawn to the surface of the concrete 13. The concrete 13 becomes harder with every finishing.

The saw 10 can cut the concrete 13 at this time and form good grooves. Preferably, the surface of the concrete is allowed to air dry so the last layer of moisture from the finishing operation can evaporate. This air drying insures that the weight of the saw 10 will not cause the skid plate 24 and the wheels 14–20, to mark the surface of the concrete 13. This air drying typically takes from 15 minutes on a warm day, to one hour on a cold day.

It is believed that a conventional saw could not cut concrete at this stage and produce an acceptable surface adjacent the cut groove because of excessive spalling and cracking. Further, the weight of an abrasive cutting machine would cause the wheels of the machine to mark the surface of the concrete 13. A conventional hand saw with a concrete blade would not have this significant weight problem, but such a saw would leave an unacceptable jagged edge adjacent the cut groove, and its skid plate would mark the surface of the concrete 13.

The saw 10 in the illustrated embodiment allows the use of equipment and motors that are considerably lighter and less powerful than previously used. The saw 10 allows cutting of grooves at a time which was not previously considered practical or feasible for cutting grooves in concrete, and with a groove quality that is unexpected for the softness of the concrete.

Several tests were conducted in an attempt to more precisely define the hardness of the concrete 13 which can be cut by the saw 10. A steel rod weighing about 5.75 pounds, having a diameter of 1.125 inches, was dropped from a height of about 23.75 or 24 inches from the surface of the concrete 13. The rod had a flat end with the 23.75 dimension being from the surface of the concrete 13 to the flat end of the steel rod. The depth of the indentation formed by rod in the concrete 13 was then measured.

For an indentation of about 0.4 to 0.5 inches, the saw 10 produced a good cut with no rough edges adjacent the cut groove. This test was conducted with the concrete 13 somewhere in the fresno stage. The wheels 14 through 20, and the skid plate 24 did leave visible tracks on the surface of the concrete 13. Conventional saws would not produce acceptable cuts at this stage. The water lubricant on an abrasive water saw washes away the concrete and also the aggregate; if the water is not used, the cut groove fills up with concrete. A conventional rotary hand saw with a blade designed for cutting concrete produces a jagged cut with partial blockage of the cut, as well as leaving gouges from the plate contacting the concrete 13.

For a rod indentation of about 0.3 to 0.4 inches, the saw 10 still produces a good cut, and the wheels 14 through 20 and the skid plate 24 leave very slight marks or indentations in the surface of the concrete 13. Conventional saws do not work at this hardness. The water lubricant from the abrasive saw washes away the concrete and the smaller aggregate, but does cut through the larger aggregate which is bound by the cement. A conventional rotary hand saw with a blade designed for cutting concrete still produces a jagged cut with partial blockage of the cut, and also leaves marks from the plate contacting the concrete 13.

When the rod makes an indentation of about ⅛ of an inch, the saw 10 still makes a good cut, with a perceptible, but small indentation in the concrete from the wheels 14 through 20 and the skid plate 24. Conventional saws do not work since the water lubricated abrasive saw still washes away the concrete adjacent the cut groove, and its wheels leave noticeable indentations in the surface of the concrete 13. The mid to large sized aggregate adjacent the surface of the cut groove is chipped out of the way leaving cavities. If the water is not used, the cut groove fills up with concrete. The conventional rotary hand saw still leaves a jagged edge to the cut groove.

When the rod makes a perceptible round indentation of about 1/32 to 1/16 of an inch, the saw 10 produces a good quality cut with smooth edges, and almost no perceptible marks from the wheels 14 through 20 and skid plate 24. Even at this stage, the hardness of the concrete is not sufficient to allow measurement by the Swiss Hammer. Conventional saws still do not work at this concrete hardness. The water lubricated abrasive saw leaves a cut with rounded edges, and cavities where the aggregate and some surrounding cement are chipped away. If the water is not used, the edges are not so rounded, but the cavities remain. The conventional rotary saw with a blade designed for cutting concrete also has chipped and rough edges, with residual cracking around the aggregate adjacent the edge of the cut groove.

Conventional concrete saws, with a blade rotating at about 1700 rpm, produce a minimally acceptable cut groove when the concrete 13 has reached a hardness well in excess of 1200 pounds per square inch (psi), as measured by a Swiss Hammer. This hardness typically does not occur until the next day, as previously mentioned. At this hardness, there is some chipping and roughness at the edges of the cut groove, but the resulting cavities, cracks, and roughness are relatively small, ranging from the size of the sand used in the concrete to about 1/8 of an inch and larger.

A conventional rotary saw with a blade designed to cut concrete, and with a rotational speed of about 11,000 rpm, does not begin to produce a cut groove with a quality that is approaching an acceptable quality, until the concrete has reached a hardness of about 1200 psi or higher. Again, there is some cracking, chipping and roughness at the edges of the cut groove, but the size of the cavities and roughness are relatively small as described above.

I claim:

1. A piece of concrete of sufficient size to form random stress cracks, the piece of concrete having a surface with at least one groove cut therein in accordance with the following method:

finishing an exterior surface of the concrete;

cutting said groove in the surface with a rotating blade having an up-cut rotation and having a cutting edge and sides, the cutting occurring before the concrete has hardened sufficiently to allow cutting by a conventional abrasive concrete saw, while still producing an acceptable surface finish adjacent the cut groove, the cutting step occurring before the concrete has a hardness such that a 1.125 inch diameter steel rod having a flat end, and weighing about 5.75 pounds, would cause an indentation in the surface of the concrete of about 1/32 of an inch when the rod is dropped from a height of about 24 inches above the surface of the concrete; and supporting the surface immediately adjacent the sides of the cutting blade sufficiently close to, and along a sufficient portion of, the cutting blade to prevent damage to the surface as the groove is cut and to produce an acceptable surface finish adjacent the cut groove.

2. A piece of concrete of sufficient size to form random stress cracks, the piece of concrete having a finished surface with at least one groove cut therein in accordance with the following method:

finishing the exterior surface of the concrete;

cutting said groove in the surface with a rotating blade having an up-cut rotation and having a cutting edge and sides, the cutting occurring before the concrete has hardened sufficiently to allow cutting by a conventional abrasive concrete saw, while still producing an acceptable surface finish adjacent the cut groove, the cutting step occurring when the concrete has a hardness such that a 1.125 inch diameter steel rod with a flat end, and weighing about 5.75 pounds, would cause an indentation in the surface of the concrete of about 1/32 to 1/2 of an inch when the rod is dropped from a height of about 24 inches above the surface of the concrete; and supporting the surface immediately adjacent the sides of the cutting blade within 1/16 to 1/8 of an inch of the sides of the cutting blade, along a portion of the cutting blade sufficient to prevent damage to the surface as the groove is cut.

3. A piece of concrete as defined in claim 1, wherein the cutting step occurs when the concrete surface has a hardness such that the steel rod causes an indentation of about 1/32 of an inch.

4. A piece of concrete as defined in claim 1, wherein the cutting step occurs when the concrete surface has a hardness such that the steel rod causes an indentation of about 0.3 to 1/32 of an inch.

5. A piece of concrete as defined in claim 1, wherein the step of supporting the concrete comprises supporting the concrete surface within 1/16 to 3/32 of an inch of the sides of at least the cutting edge of the blade where the up-cutting blade exits the surface.

6. A piece of concrete as defined in claim 3, wherein the step of supporting the concrete comprises supporting the concrete surface within 1/16 to 3/32 of an inch of the sides of the cutting blade by at least the curling edge of the blade where the up-cutting blade exits the surface.

7. A piece of concrete as defined in claim 1, wherein the step of supporting the concrete comprises supporting the concrete surface along at least the cutting edge of the blade where the up-cutting blade exits the surface.

8. A piece of concrete as defined in claim 2, wherein the method further comprises the step of pivoting the cutting blade away from the exterior surface of the concrete when the cutting blade contacts an obstruction in the concrete.

9. A piece of concrete as defined in claim 8, wherein the method further comprises the step of rollably supporting the cutting blade on the concrete surface.

10. A piece of concrete as defined in claim 9, wherein the step of supporting the concrete surface during cutting further comprises the step of supporting the concrete surface along a substantial length of the cutting blade.

11. A piece of concrete as defined in claim 9, wherein the step of supporting the concrete surface during cutting further comprises the step of supporting the concrete surface along less than a substantial length of the cutting blade.

12. A piece of concrete as defined in claim 11, wherein the concrete cutting blade has cutting segments with sides having a radial length, and the step of supporting the concrete surface during cutting comprises the step of supporting the concrete surface at the location where the cutting segments exit the concrete in an up-cut rotation, and supporting the concrete along a length corresponding to at least the radial length of the cutting segments.

13. A piece of concrete as defined in claim 9, wherein the concrete surface further comprises a plurality of grooves cut at predetermined intervals by the defined method.

14. A piece of concrete as defined in claim 9, wherein the groove has a width which is not reduced after the groove is cut by the rotating blade by the steps of supporting the surface or rollably supporting the cutting blade.

15. A piece of concrete as defined in claim 9, comprising the further step of resiliently urging the rotating blade into the concrete surface during cutting.

16. A piece of concrete as defined in claims 1, 2, 3, 4, 5, 6 or 7, wherein the method further comprises the step of pivoting the cutting blade away from the exterior surface of the concrete when the cutting blade contacts an obstruction in the concrete.

17. A piece of concrete as defined in claims 1, 2, 3, 4, 5, 6 or 7, wherein the method further comprises the step of rollable supporting the cutting blade on the concrete surface.

18. A piece of concrete as defined in claims 1, 2, 3, 4, 5, 6 or 7, wherein the step of supporting the concrete surface during cutting comprises the step of supporting the concrete surface along the sides of the cutting blade where the leading and trailing edges of the cutting blade exit and enter the concrete surface.

19. A piece of concrete as defined in claims 1, 2, 3, 4, 5, 6 or 7 wherein the step of supporting the concrete surface during cutting further comprises the step of supporting the concrete surface along a substantial length of the cutting blade.

20. A piece of concrete as defined in claims 1, 2, 3, 4, 5, 6 or 7, wherein the step of supporting the concrete surface during cutting further comprises the step of supporting the concrete surface along less than a substantial length of the cutting blade.

21. A piece of concrete as defined in claims 1, 2, 3, 4, 5, 6 or 7, wherein the concrete cutting blade has cutting segments with sides having a radial length, and the step of supporting the concrete surface during cutting comprises the step of supporting the concrete surface at the location where the cutting segments exit the concrete in an up-cut rotation, and supporting the concrete along a length corresponding to the radial length of the cutting segments.

22. A piece of concrete as defined in claims 1, 2, 3, 4, 5, 6 or 7, wherein the concrete surface further comprises a plurality of grooves cut at predetermined intervals by the defined method.

23. A piece of concrete as defined in claims 1, 2, 3, 4, 5, 6 or 7, wherein the groove has a width which is not reduced after the groove is cut by the rotating blade by the steps of supporting the surface or rollably supporting the cutting blade.

24. A piece of concrete as defined in claims 1, 2, 3, 4, 5, 6 or 7, comprising the further step of resiliently urging the rotating blade into the concrete surface during cutting.

25. A piece of concrete of sufficient size to form random stress cracks, the concrete having an exterior surface with a hardness below 1200 psi with at least one crack control groove cut therein in accordance with the following method:

finishing the exterior surface of the concrete;

cutting the groove in the surface with a rotating blade having an up-cut rotation and having a cutting edge and sides, the cutting occurring before the concrete has hardened sufficiently to allow cutting by a conventional abrasive concrete saw, while still producing an acceptable surface finish adjacent the cut groove, the cutting step occurring before the concrete has hardness such that a 1.125 inch diameter steel rod having a flat end, and weighing about 5.75 pounds, would cause an indentation in the surface of the concrete of about 1/32 of an inch when the rod is dropped from a height of about 24 inches above the surface of the concrete; and supporting the surface immediately adjacent the sides of the cutting blade sufficiently close to, and along a sufficient portion of the cutting blade to prevent damage to the surface as the groove is cut and to produce an acceptable surface finish adjacent the cut groove.

26. A piece of concrete having a finished concrete surface, the piece of concrete being of sufficient size to form random stress cracks, the concrete surface having a hardness below 1200 psi with at least one crack control groove cut therein in accordance with the following method:

finishing an exterior surface of the concrete;

cutting the groove in the surface with a rotating blade having an up-cut rotation and having a cutting edge and sides, the cutting occurring before the concrete has hardened sufficiently to allow cutting by a conventional abrasive concrete saw, while still producing an acceptable surface finish adjacent the cut groove, the cutting step occurring when the concrete has a hardness such that a 1.125 inch diameter steel rod with a flat end, and weighing about 5.75 pounds, would cause an indentation in the surface of the concrete of about 1/32 to 1/2 of an inch when the rod is dropped from a height of about 24 inches above the surface of the concrete; and supporting the surface immediately adjacent the sides of the cutting blade within 1/16 to 1/8 of an inch of the sides of the cutting blade, along along a portion of the cutting blade sufficient to prevent damage to the concrete surface as the groove is cut.

27. A piece of concrete as defined in claim 25 or 26, wherein the cutting step occurs when the concrete has a hardness such that the steel rod causes an indentation of about 1/32 of an inch.

28. A piece of concrete as defined in claim 25 or 26, wherein the cutting step occurs when the concrete has a hardness such that the steel rod causes an indentation of about 0.3 to 1/32 of an inch.

29. A piece of concrete as defined in claim 25 or 26, wherein the step of supporting the concrete comprises supporting the concrete surface within 1/16 to 3/32 of an inch of the sides of at least the cutting edge of the blade there the up-cutting blade exits the surface, and further comprising rollably-supporting the saw on the concrete during the cutting step.

30. A piece of concrete as defined in claim 25 or 26, wherein the step of supporting the concrete comprises supporting the concrete surface within 1/16 to 3/32 of an inch of the sides of the cutting blade by at least the cutting edge of the blade where the up-cutting blade exits the surface.

31. A piece of concrete as defined in claim 25 or 26, wherein the step of supporting the concrete comprises supporting the concrete surface at least at the cutting edge of the blade where the up-cutting blade exits the surface.

32. A piece of concrete as defined in claim 25 or 26, wherein the method further comprises the step of pivoting the cutting blade away from the exterior surface of the concrete when the cutting blade contacts an obstruction in the concrete.

33. A piece of concrete as defined in claim 25 or 26, wherein the method further comprises the step of rollably supporting the cutting blade on the concrete surface.

34. A piece of concrete as defined in claim 25 or 26, wherein the step of supporting the concrete surface during cutting further comprises the step of supporting the concrete surface along a substantial length of the cutting blade.

35. A piece of concrete as defined in claim 25, wherein the step of supporting the concrete surface during cutting further comprises the step of supporting the concrete surface along less than a substantial length of the cutting blade.

36. A piece of concrete as defined in claim 25 or 26, wherein the concrete cutting blade has cutting segments with sides having a radial length, and the step of supporting the concrete surface during cutting comprises the step of supporting the concrete surface at the location where the cutting segments exit the concrete in an up-cut rotation, and supporting the concrete along a length corresponding to at least the radial length of the cutting segments.

37. A piece of concrete as defined in claim 25 or 26, wherein the concrete cutting blade has cutting segments with sides having a radial length, and the step of supporting the concrete surface during cutting comprises the step of supporting the concrete surface at the location where the cutting segments exit the concrete in an up-cut rotation, and supporting the concrete along a length corresponding to at least the radial length of the cutting segments, and further comprising the step of rollably supporting the cutting blade on the concrete surface during cutting.

38. A piece of concrete as defined in claim 25 or 26, wherein the groove has a width which is not reduced after the groove is cut by the rotating blade by the steps of supporting the surface or rollably supporting the cutting blade.

39. A piece of concrete as defined in claim 25 or 26, comprising the further step of resiliently urging the rotating blade into the concrete surface during cutting.

40. A piece of concrete as defined in claim 25 or 26, wherein the method further comprises the step of pivoting the cutting blade away from the exterior surface of the concrete when the cutting blade contacts an obstruction in the concrete, and further comprising the step of rollably supporting the cutting blade on the concrete surface during cutting.

41. A piece of concrete as defined in claim 25 or 26, wherein the method further comprises the step of rollably supporting the cutting blade on the concrete surface during cutting.

42. A piece of concrete as defined in claim 25 or 26, wherein the step of supporting the concrete surface during cutting comprises the step of supporting the concrete surface along the sides of the cutting blade where the leading and trailing edges of the cutting blade exit and enter the concrete surface, and further comprising the step of rollably supporting the cutting blade on the concrete surface during cutting.

43. A piece of concrete as defined in claim 1, 2, 3, 4, 5, 6, 7, 25 or 26, wherein the cutting step comprises cutting the groove to a depth that is greater than 0.125 inches but less than ⅛ the thickness of the concrete.

* * * * *